United States Patent
Macken et al.

(10) Patent No.: US 8,891,204 B2
(45) Date of Patent: *Nov. 18, 2014

(54) BIASING STRUCTURE FOR WRITE ELEMENT DOMAIN CONTROL IN A MAGNETIC WRITER

(71) Applicant: Seagate Technology LLC, Cupertino, CA (US)

(72) Inventors: Declan Macken, Prior Lake, MN (US); Eric Walter Singleton, Maple Plain, MN (US); Peter Jeremy Czoschke, Bloomington, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/686,568

(22) Filed: Nov. 27, 2012

(65) Prior Publication Data

US 2013/0083429 A1    Apr. 4, 2013

Related U.S. Application Data

(63) Continuation of application No. 12/360,145, filed on Jan. 27, 2009, now Pat. No. 8,320,075.

(51) Int. Cl.
 *G11B 5/127* (2006.01)
 *G11B 5/31* (2006.01)
 *G11B 5/00* (2006.01)

(52) U.S. Cl.
 CPC ........ *G11B 5/127* (2013.01); *G11B 2005/0008* (2013.01); *G11B 5/1278* (2013.01); *G11B 5/3133* (2013.01)
 USPC .................................................... 360/125.03

(58) Field of Classification Search
 None
 See application file for complete search history.

(56) References Cited

U.S. PATENT DOCUMENTS

| | | | |
|---|---|---|---|
| 6,178,066 B1 * | 1/2001 | Barr .......................... | 360/125.33 |
| 6,198,597 B1 | 3/2001 | Tateyama et al. | |
| 6,437,949 B1 | 8/2002 | Macken et al. | |
| 6,710,982 B2 | 3/2004 | Mack et al. | |
| 6,791,796 B2 | 9/2004 | Shukh et al. | |
| 6,807,031 B2 | 10/2004 | Macken et al. | |
| 6,867,468 B2 | 3/2005 | Sharma et al. | |
| 7,126,795 B2 | 10/2006 | Funayama et al. | |
| 7,199,975 B1 | 4/2007 | Pan | |
| 2002/0145832 A1 | 10/2002 | Seigler et al. | |
| 2004/0004786 A1 * | 1/2004 | Shukh et al. ................... | 360/126 |
| 2006/0044680 A1 | 3/2006 | Liu et al. | |
| 2006/0176601 A1 | 8/2006 | Amin et al. | |
| 2006/0198047 A1 * | 9/2006 | Xue et al. ...................... | 360/126 |
| 2006/0198185 A1 | 9/2006 | Hiebert et al. | |
| 2007/0035884 A1 | 2/2007 | Lim et al. | |
| 2008/0278865 A1 * | 11/2008 | Tsunekawa et al. ..... | 360/324.12 |

* cited by examiner

*Primary Examiner* — James G Norman
(74) *Attorney, Agent, or Firm* — HolzerIPLaw, PC (57) ABSTRACT

A magnetic writer includes a write element having a first domain pattern when in a quiescent state and a second domain pattern when in an active state. A biasing structure is configured to induce the write element into the first domain pattern when the magnetic writer is in the quiescent state.

17 Claims, 8 Drawing Sheets

BIASING STRUCTURE FOR WRITE ELEMENT DOMAIN CONTROL IN A MAGNETIC WRITER

PRIORITY CLAIM

This application is a continuation of U.S. patent application Ser. No. 12/360,145, entitled, "Biasing Structure for Write Element Domain Control in a Magnetic Writer," filed Jan. 27, 2009, expected to issue on Nov. 27, 2012 as U.S. Pat. No. 8,320,075, which is hereby incorporated by reference in its entirety.

BACKGROUND

In an electronic data storage and retrieval system, a transducing head typically includes a writer for storing magnetically-encoded information on a magnetic disc and a reader for retrieving that magnetically encoded information from the magnetic disc. For a perpendicular recording head, the writer portion typically includes a main (or write element) pole and a return pole, which are separated from each other at a medium confronting surface of the writer by a gap layer, and which are connected to each other at a region distal from the air bearing surface by a back gap closer or back via. One or more layers of conductive coils are positioned between the main and return poles, and are encapsulated by insulating layers.

To write data to the magnetic media, an electric current is caused to flow through the conductive coils to induce a magnetic field across the write gap between the main and return poles. By reversing the direction of the current through the coils, the polarity of the data written to the magnetic media is reversed. In perpendicular recording, magnetic signals are conducted through the main pole in a manner that orients the magnetic moments of the recording medium perpendicularly to the surface of the recording medium. The amount of data that can be recorded in a given area (i.e., the areal density) can be improved by reducing the surface area of the pole tip of the writing pole and by increasing the linear density and the frequency at which data is recorded.

One issue confronting some magnetic writers is the occurrence of unwanted erasure of portions of the magnetic medium following a write operation. This has been attributed to the remnant domain state of the write element. More particularly, the desirable easy axis remnant domain configuration in the write element is significantly degraded when the write element is magnetized along the hard axis, which occurs during the write operation. One approach to resolving this issue is to laminate magnetic layers of the write element with nonmagnetic layers. However, because the laminating layers are nonmagnetic, this approach results in a decrease of the effective moment of the write element, which decreases the ability of the write field to overcome the coercivity of the magnetic medium.

SUMMARY

The present invention relates to a magnetic writer including a write element having a first domain pattern when the magnetic writer is in a quiescent state and a second domain pattern when the magnetic writer is in an active state. A biasing structure is configured to induce the write element into the first domain pattern when the write element is in the quiescent state.

DETAILED DESCRIPTION

Figure 1:
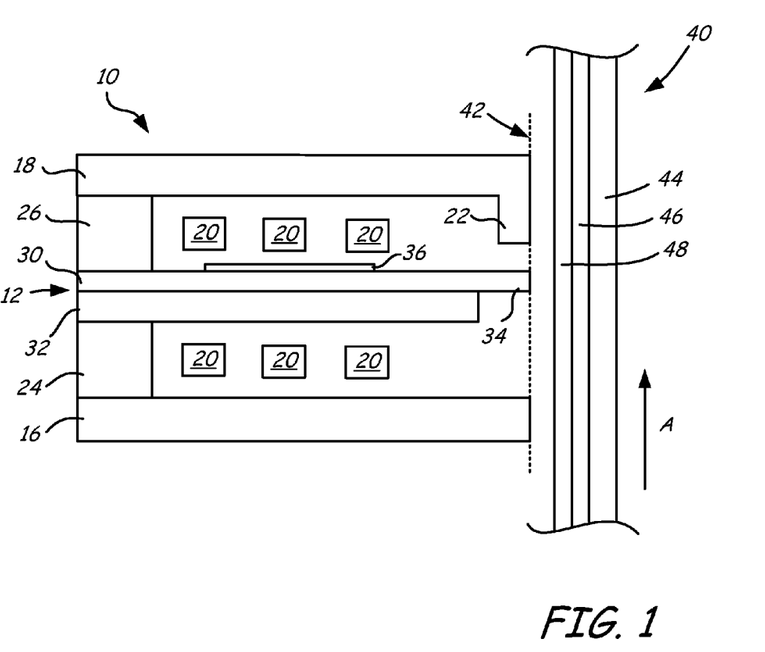
FIG. 1 is a cross-section view of a magnetic writer including a biasing structure for controlling the domain pattern of the write element.
Figure 1A:
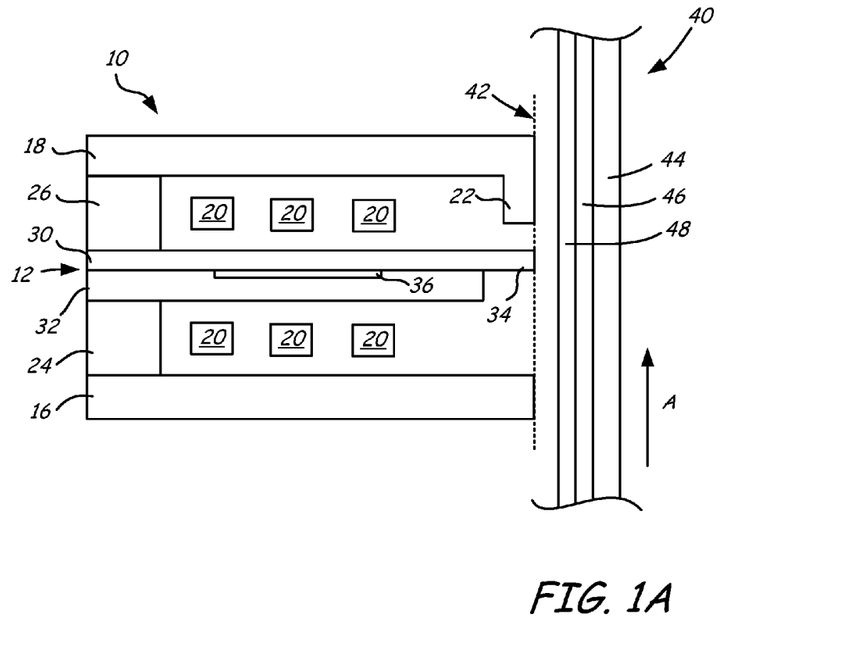
FIGS. 1A-1E illustrate the magnetic writer of FIG. 1 with alternate biasing structures.
Figure 1B:
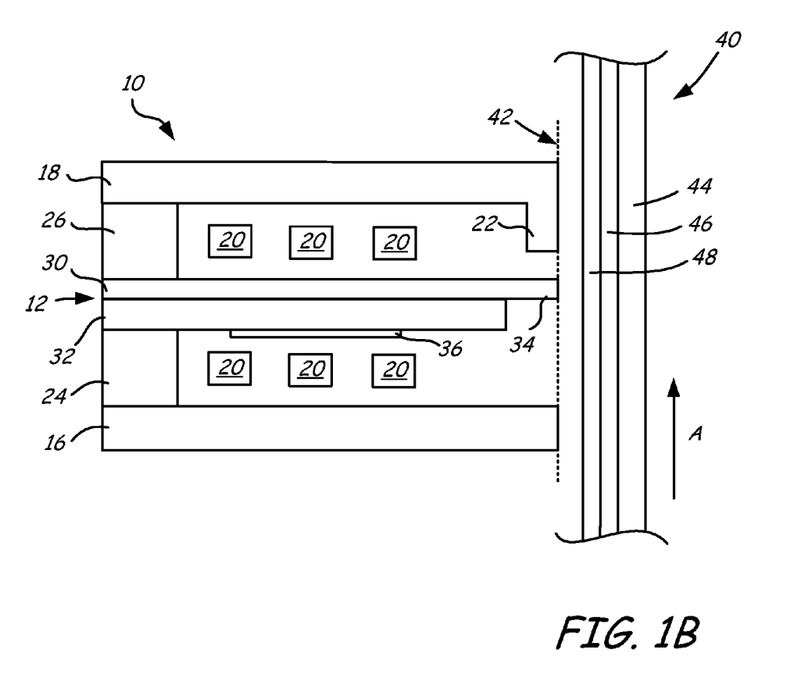
Figure 1C:
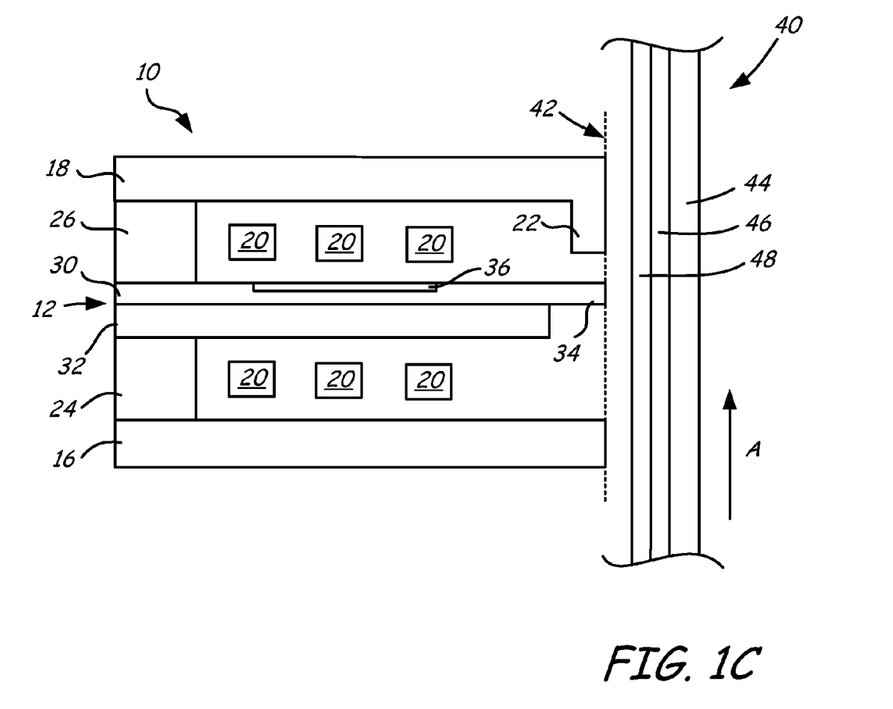
Figure 1D:
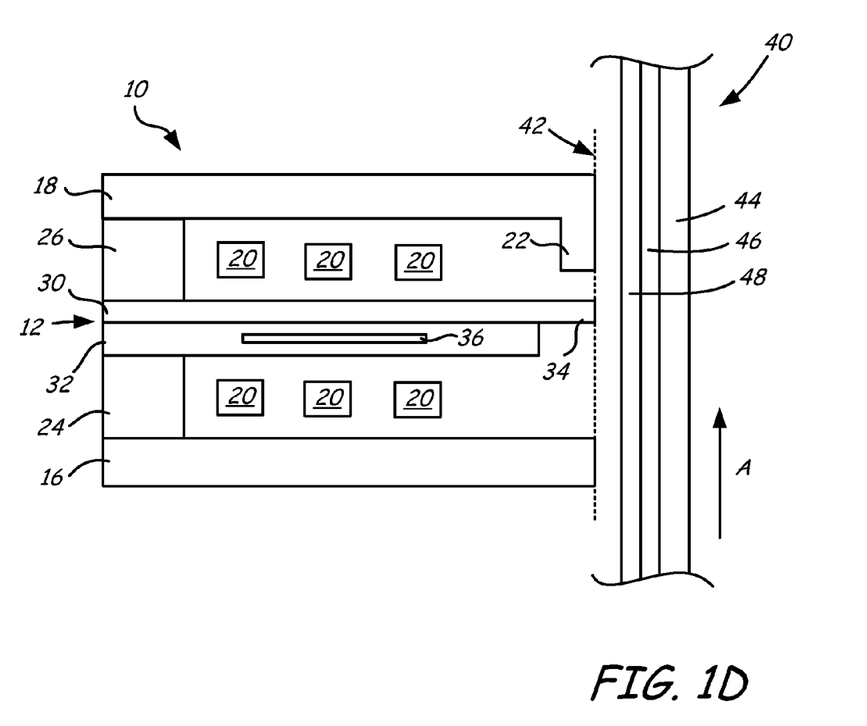
Figure 1E:
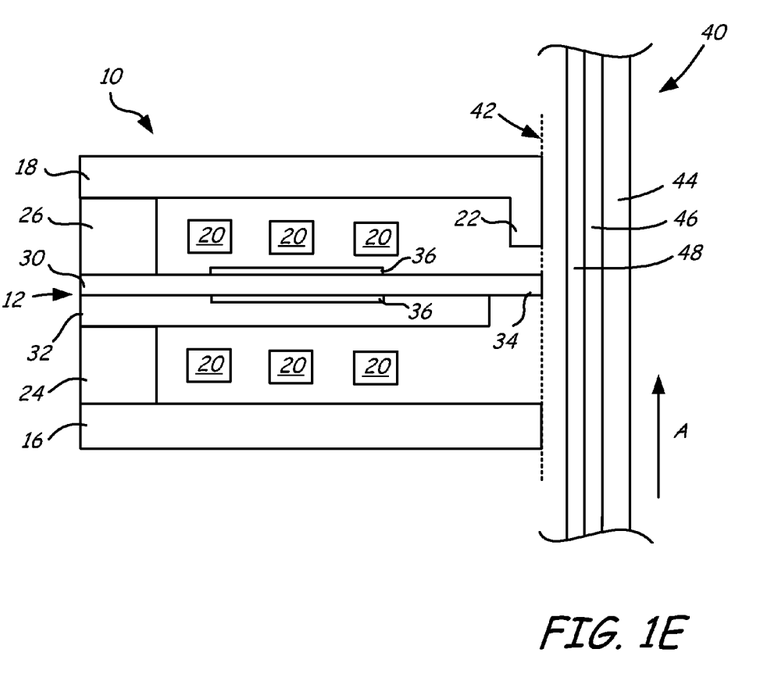

FIG. 1 is a cross-section view of magnetic writer 10, which includes write pole or element 12, first return pole or element 16, second return pole or element 18, and conductive coil 20. Write pole 12 is magnetically coupled to first return pole 16 by first magnetic stud 24, and to second return pole 18 by second magnetic stud 26. Conductive coil 20 surrounds write pole or element 12 such that portions of conductive coil 20 are disposed between write pole 12 and first return pole 16, and between write pole 12 and second return pole 18. Trailing shield 22 extends from second return pole 18 toward write pole 12. Write pole 12 includes write pole body 30 and yoke 32. Write pole body 30 includes write pole tip 34. Biasing structure 36, which will be described in more detail below, is adjacent write pole 12. It should also be noted that while biasing structure 36 is shown in FIG. 1 coupled to a top surface of write pole body 30, biasing structure 36 may be coupled to the bottom surface of write pole body 30 and the top surface of yoke 32 (FIG. 1A), to the bottom surface of yoke 32 (FIG. 1B), and/or formed as a part of write pole body 30 (FIG. 1C) or yoke 32 (FIG. 1D). Biasing structure 36 can also be formed by multiple biasing layers (FIG. 1E).

First return pole 16, second return pole 18, first magnetic stud 24, and second magnetic stud 26 may comprise soft magnetic materials, such as NiFe. Conductive coil 20 may comprise a material with low electrical resistance, such as Cu. Write pole body 30 may comprise a high moment soft magnetic material, such as CoFe, and yoke 32 and shield 22 may comprise a soft magnetic material, such as NiFe, to improve the efficiency of flux delivery to write pole body 30.

Magnetic writer 10 confronts magnetic medium 40 at front surface 42 defined by write pole tip 34, first return pole 16, and second return pole 18. Magnetic medium 40 includes substrate 44, soft underlayer (SUL) 46, and medium layer 48. SUL 46 is disposed between substrate 44 and medium layer 48. Magnetic medium 40 is positioned proximate to magnetic writer 10 such that the surface of medium layer 48 opposite SUL 46 faces write pole 12. Magnetic medium 40 is shown merely for purposes of illustration, and may be any type of medium usable in conjunction with magnetic writer 10, such as composite media, continuous/granular coupled (CGC) media, discrete track media, and bit-patterned media.

Magnetic writer 10 is carried over the surface of magnetic medium 40, which is moved relative to magnetic writer 10 as indicated by arrow A such that write pole 12 trails first return pole 16, leads second return pole 18, and is used to physically write data to magnetic medium 40. In order to write data to magnetic medium 40, a current is caused to flow through conductive coil 20. The magnetomotive force in conductive coil 20 causes magnetic flux to travel from write pole tip 34 perpendicularly through medium layer 48, across SUL 46, and through first return pole 16 and first magnetic stud 24 to provide a first closed magnetic flux path. The direction of the write field at the medium confronting surface of write pole tip 34, which is related to the state of the data written to magnetic medium 40, is controllable based on the direction that the first current flows through first conductive coil 20.

Stray magnetic fields from outside sources, such as a voice coil motor associated with actuation of magnetic writer 10 relative to magnetic medium 40, may enter SUL 46. Due to the closed magnetic path between write pole 12 and first return pole 16, these stray fields may be drawn into magnetic writer 10 by first return pole 16. In order to reduce or eliminate these stray fields, second return pole 18 is connected to write pole 12 via second magnetic stud 26 to provide a flux path for the stray magnetic fields. The stray fields enter first return pole 16, travels through first magnetic stud 24 and second magnetic stud 26, and exits magnetic writer 10 via second return pole 18.

Magnetic writer 10 is shown merely for purposes of illustrating an example construction that may be used in conjunction with the principles of the present invention, and variations on this design may be made. For example, while write pole 12 includes write pole body 30 and yoke 32, write pole 12 can also be comprised of a single layer of magnetic material. In addition, a single trailing return pole 18 may be provided instead of the shown dual return pole writer configuration. Furthermore, while conductive coils 20 are shown formed around write pole 12, conductive coils 20 may alternatively be formed around either or both of magnetic studs 24 and 26.

Figure 2:
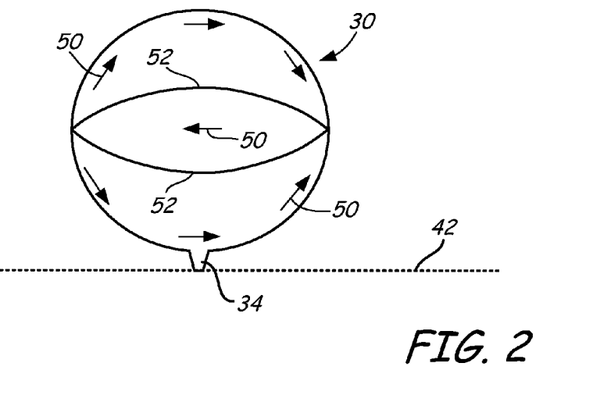
FIG. 2 is a top view of an embodiment of a write pole body, showing the pattern formed by the magnetic domains when the magnetic writer is in a quiescent state.

FIG. 2 is a top view of an embodiment of write pole body 30, showing the pattern formed by magnetic domains 50 when magnetic writer 10 is in a quiescent state (i.e., write current is not flowing in conductive coils 20 and no writing of data by magnetic writer 10 is taking place). Magnetic domains 50 arrange into a pattern that is a function of the shape and anisotropy of write pole body 30. This pattern, which may be referred to as the easy axis domain state, is a low energy domain state that write pole body 30 returns to after an easy axis magnetic setting operation. When magnetic writer 10 (and therefore write pole 12) is in a quiescent state, the domains follow the edges of write pole body 30 having a rounded shape, and two magnetic vortex states are formed (one at the top and one at the bottom of write pole body 30). Domain walls 52 form where the magnetization changes direction around the central portion of write pole body 30 where intersection of the two magnetic vortex states occurs. Domain walls 52 extend between cross-track sides of write pole body 30, wherein domain walls 52 are distal from each other in the middle of write pole body 30 and meet each other at the cross-track sides of write pole body 30.

During a write operation (i.e., when magnetic writer is in an active state), the magnetic domains of write pole body 30 are induced into a higher energy domain state by the magnetomotive force in conductive coil 20 (e.g., magnetic domains 50 are directed perpendicular to medium confronting surface 42), resulting in a different domain pattern. In order to prevent erasure after writing, the magnetic domains 50 may be induced back to the easy axis domain state to assure magnetic remanence after the write operation does not affect adjacent bits or tracks on magnetic medium 40.

Figure 3:
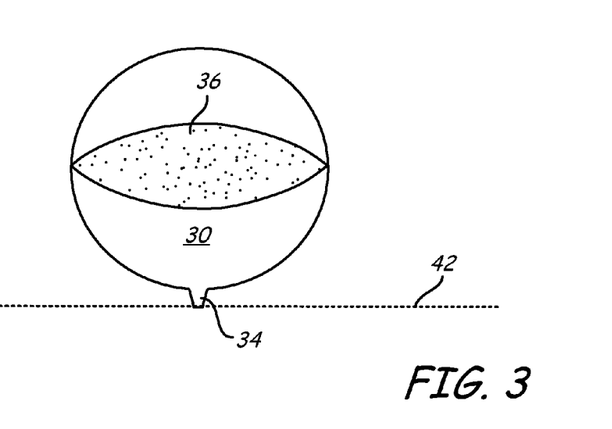
FIG. 3 is a top view of a circular write pole body including a biasing structure adjacent a central portion of the write element body.

FIG. 3 is a top view of write pole body 30 including biasing structure 36 (which is stippled in FIG. 3) adjacent a central portion of write pole body 30. In order to determine the appropriate shape of biasing structure 36, an analysis of the domain pattern of write pole body 30 in a quiescent state may be performed. For example, Kerr and/or magnetic force microscopy (MFM) studies of the magnetic state of write pole body 30 may be performed to establish the location of domain walls and the magnetic domain directions of write pole body 30.

In order to induce write pole body 30 into the easy axis domain state after a write operation, biasing structure 36 may be formed adjacent to write pole body 30. Biasing structure 36 has a shape that is substantially similar to the domain walls that form in the easy axis domain state. That is, biasing structure 36 has a generally oval or football shape that is rounded proximate a center of write pole body 30 and generally pointed proximate opposing, cross-track edges of the write pole body 30. In addition, the magnetization direction of biasing structure 36 is substantially similar to the easy axis domain state direction between the domain walls. As a result of this arrangement, the domains of write pole body 30 return to the more stable easy axis domain pattern, and erasure after writing due to remanent magnetization is prevented.

Biasing structure 36 may be made of any material that is capable of biasing write pole body 30 into the easy axis domain state. For example, biasing structure 36 may comprise an antiferromagnet (AFM) that is exchange coupled to write pole body 30. In some embodiments, the AFM comprises a synthetic antiferromagnet (SAF). Biasing structure 36 may also comprise a permanent magnet (PM).

Figure 4:
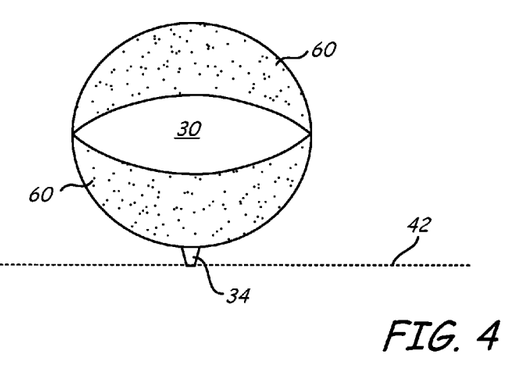
FIG. 4 is a top view of a circular write pole body including a biasing structure having portions proximate to and distal from the medium confronting surface.

Biasing structure 36 may also have a different configuration or arrangement based on the domain pattern. FIG. 4 is a top view of a circular write pole body including a biasing structure 60 having portions proximate to and distal from the medium confronting surface. In this embodiment, biasing structure 60 is formed on portions of the top surface of write pole body 30 that are outside of the region defined by domain walls 52. This is in contrast to the embodiment shown in FIG. 3, in which biasing structure 36 is formed in the region defined by domain walls 52. 4

Figure 5:
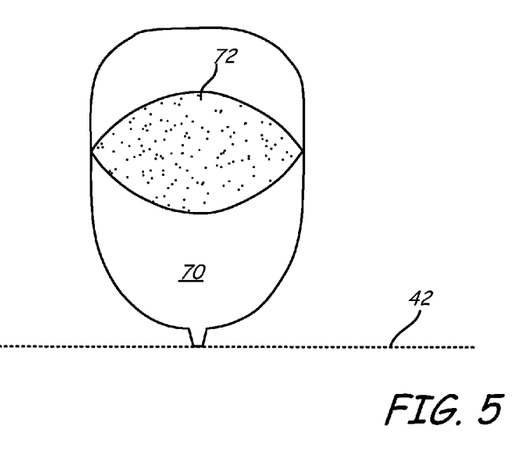
FIG. 5 is a top view of a rounded write pole body including a biasing structure adjacent a central portion of the write element body.

FIG. 5 is a top view of another embodiment, which includes write element body 70 with biasing structure 72. In this embodiment, write element body 70 is elongated along an axis perpendicular to medium confronting surface 42. Similar to the circular write pole body 30 shown in FIGS. 2-4, the magnetization gradually changes direction, and the domains follow the edges of write element body 70. Two magnetic vortex states are formed, and domain walls form around the central portion of write element body 70. In this embodiment, biasing structure 72 is oval or football shaped and is formed in the region defined by the domain walls. Biasing structure 72 has a different profile than biasing structure 36 due to the different easy axis domain pattern of write element body 70.

In summary, the present invention relates to a magnetic writer including a write element having a first domain pattern when in a quiescent state and a second domain pattern when in an active state. A biasing structure is configured to induce the write element into the first domain pattern when the write element is not in the active state. By biasing the domains of the write element into a more energetically favorable pattern when the write element is not active (i.e., quiescent), erasure after writing by the write element is prevented. In addition, the biasing structure does not require nonmagnetic laminating layers to be incorporated into the write element structure in order to achieve the first domain pattern when the write element is in a quiescent state. As a result, the effective moment of the write element remains high.

Although the present invention has been described with reference to preferred embodiments, workers skilled in the art will recognize that changes may be made in form and detail without departing from the spirit and scope of the invention.

The invention claimed is:

1. A device comprising:
a biasing structure having a generally oval shape and configured to induce a write element into a first domain pattern after a write operation, wherein the first domain pattern is related to a quiescent state of the device.

2. The device of claim 1, wherein contours of the biasing structure are substantially similar to contours of the first domain pattern.

3. The device of claim 1, wherein the biasing structure is adjacent the write element.

4. The device of claim 1, wherein the write element includes a write pole body and a yoke.

5. The device of claim 4, wherein the biasing structure is adjacent at least one of the write pole body and the yoke.

6. The device of claim 4, wherein the biasing structure includes a layer within one of the write pole body and the yoke.

7. The device of claim 1, wherein the biasing structure comprises an antiferromagnet exchange coupled to the write element.

8. The device of claim 7, wherein the antiferromagnet comprises a synthetic antiferromagnet (SAF).

9. The device of claim 1, wherein the biasing structure comprises a permanent magnet.

10. A device comprising:
a biasing structure adjacent to or within a write element and having a generally oval shape that is based on a first domain pattern, wherein the write element has the first domain pattern when the device is in a quiescent state.

11. The device of claim 10, wherein contours of the biasing structure are substantially similar to contours of the first domain pattern.

12. The device of claim 10, wherein the biasing structure comprises an antiferromagnet exchanged coupled to the write element.

13. The device of claim 12, wherein the antiferromagnet comprises a synthetic antiferromagnet (SAF).

14. The device of claim 10, wherein the biasing structure comprises a permanent magnet.

15. A device comprising:
a write element including a write element body, wherein the write element body has a first domain pattern when the device is in a quiescent state and a second domain pattern when the device is in an active state; and
a biasing structure adjacent to or within the write element and having a generally oval shape that is substantially similar to at least a portion of the first domain pattern.

16. The device of claim 15, wherein the biasing structure comprises an antiferromagnet exchange coupled to the write element.

17. The device of claim 16, wherein the antiferromagnet comprises at least one of a synthetic antiferromagnet (SAF) or a permanent magnet.

* * * * *